Oct. 8, 1963  J. SCHWARZ  3,106,423
BACK REST HAVING AN ADJUSTABLE SHAPED ELEMENT
Filed Nov. 21, 1961  2 Sheets-Sheet 1
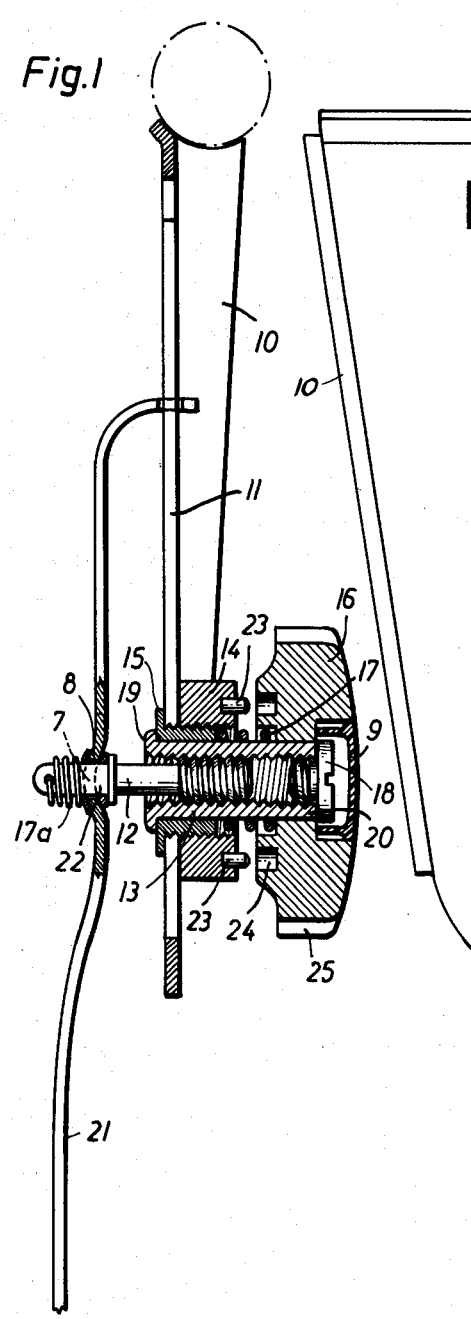
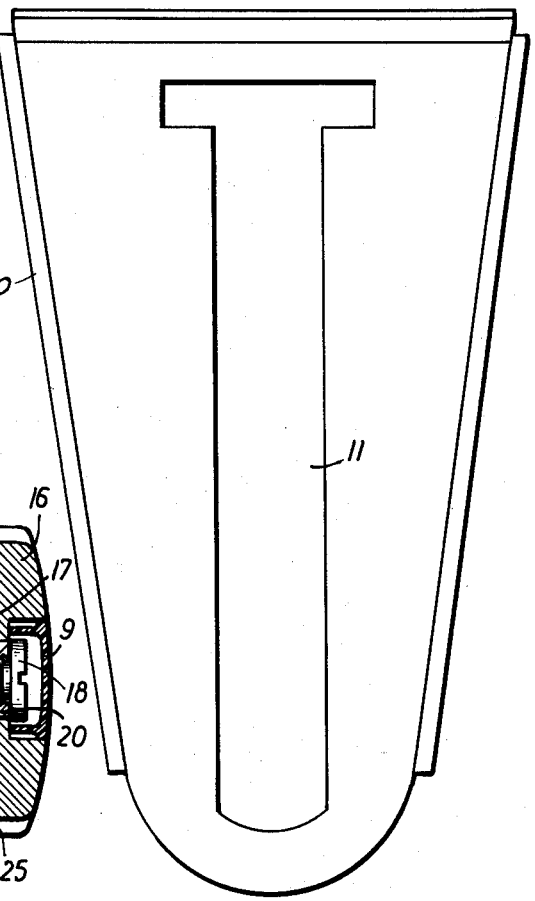
INVENTOR
Johann Schwarz
BY
ATTYS.

Oct. 8, 1963  J. SCHWARZ  3,106,423
BACK REST HAVING AN ADJUSTABLE SHAPED ELEMENT
Filed Nov. 21, 1961  2 Sheets-Sheet 2
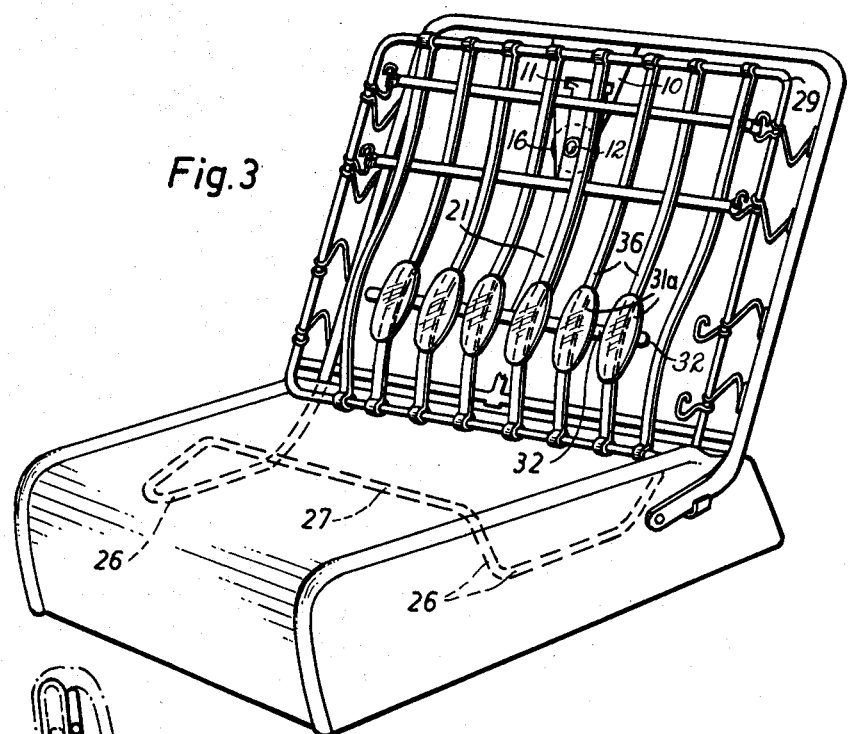
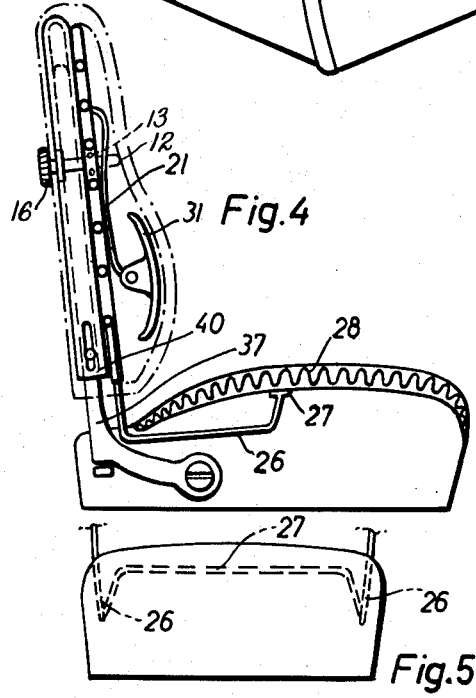
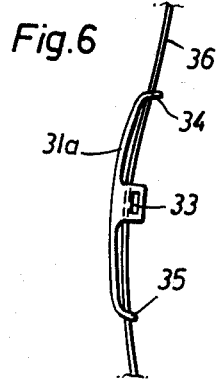
INVENTOR
Johann Schwarz
BY
Lowry & Rinehart
ATTYS.

United States Patent Office 3,106,423
Patented Oct. 8, 1963

3,106,423
BACK REST HAVING AN ADJUSTABLE
SHAPED ELEMENT
Johann Schwarz, Rheinallee 12, Leverkusen, Germany
Filed Nov. 21, 1961, Ser. No. 153,874
Claims priority, application Germany Nov. 21, 1960
4 Claims. (Cl. 297—284)

This invention relates to a back rest, for example, for motor vehicle seats, having a shaped element adjustable in the direction perpendicular to the plane of the rest.

According to the invention, a back rest is proposed which has a cross-sectional profile adjustable in a direction perpendicular to the plane of the rest, there being suspended, for example in articulated fashion, from the back rest a plate-like arcuate shaped back rest element which is secured on the back rest frame and which is adapted to be pivoted by means of adjustment elements lying out of the plane of the rest extending through its pivoting axis and which is also adapted to be vertically adjusted in the plane of the rest and locked in the individual adjustment positions.

It is the object of the invention to provide a back rest for, for example, motor vehicle seats and having a shaped element adjustable in the direction perpendicular to the plane of the rest, and it is a provision of the invention that the plate-like shaped back rest element which is pivotally secured on a frame portion of the back rest or on an intermediate portion, is connected through a resilient flat arm having an adjusting device comprising a single hand wheel, disc, handle or the like, permitting both an upward and downward and forward and rearward adjustment of the shaped element.

This new constructional form is characterized in that the adjustment device can be made flatter in that supplementary adjustment buttons or knobs or the like are no longer necessary, and in that the arrangement is more pleasing in appearance, since the single hand wheel hides the remaining parts from view.

One embodiment of the back rest, in particular for bus and lorry seats, provides a compensation bar having a rectilinear central portion and lateral portions bent over therefrom approximately at right angles, the rectilinear portions extending under the springs of the seating surface and being preferably connected therewith by means of clamps or the like, the other end of the compensation bar being secured at both ends to the lower ends of a frame portion of the back rest which is vertically movable in the fixed frame spars. In this way, the shaped element of the back rest supporting the spinal column is movably balanced and for this purpose it is further proposed that flat springs for the adjustable shaped element should be movable on the said frame portion in known manner, there being provided between both parts, preferably with the interposition of an intermediate part, such as a cross-member, bearings which diminish friction.

The invention is discussed with reference to the following drawings, illustrating diagrammatic embodiments of the invention, wherein:

FIG. 1 is a fragmentary sectional view through a simplified adjustment device;

FIG. 2 is a rear elevational view of the bearing part of FIG. 1;

FIG. 3 shows a motor vehicle seat, drawn in perspective, having a plurality of individual shaped back support elements mounted on resilient or flexible bands, belts or the like;

FIG. 4 is a side elevational view with parts omitted of a modified form of seat suitable for lorry or bus seats;

FIG. 5 is a fragmentary front elevational view of the lower portion of the seat of FIG. 4, and FIG. 6 is a fragmentary side elevational view of a mounting detail of one of the shaped elements shown in FIG. 3.

The simplified adjustment device illustrated in FIG. 1 comprises a single hand wheel 16 formed with bores 24 or the like and having a recess arranged on the opposite side for a securing screw 18. The recess is sufficiently deep to ensure that a cap 9 can be pushed over the head of the screw 18 in such manner that it is countersunk in the recess. Opposite the bores are preferably two pins 23 fixed in the outer face of a screw-threaded clamping ring 14. Furthermore, one end of a spring 17 is supported in a central aperture in the hand wheel 16, whereas its other end bears against a bearing part or a bushing 13, the bearing part being axially secured through the agency of a radial end flange 19. Disposed on the bearing part is an externally threaded bushing 15 having an end flange between flange 19 and a mounting plate 10 having a vertical guideway 11 therein through which the coaxial bushings extend. An internal screw-thread of clamping ring 14 engages the external thread of bushing 15. The bushing 13 is rotatable in the bushing 15 and engages, by means of the internal screw-thread, with a screw-threaded pin 12, the latter having a multilateral end 22 which is secured by a split pin or the like (not shown), in an opening in a resilient flat arm 21. Expediently, only a left-hand screw-thread (as shown) is used on the pin 12. The split pin can be omitted and replaced by a spring having pin-like projections which are pushed through an elongated aperture 8. The flat arm 21 has a protuberance 7 and the end 22 has a clearance relatively to the elongated aperture 8, so that a flexible, resilient bearing is formed. In a preferred arrangement a spring 17a having pin projections will be situated between a pin hole and the member 21 in order to prevent rattling.

As FIG. 1 shows, the entire adjustment device is mounted on plate 10 which is secured to the back rest. Elongated guideway 11 is provided with parallel sides and receives the inturned upper portion of the arm 21 to provide a relatively large adjustment zone.

In the form of the invention shown in FIG. 4 a shaped back rest element is pivotally secured to the free end of arm 21, and when the element is to be forwardly or rearwardly adjusted, the hand wheel 16 is turned to the left or to the right. Since it is disposed on 2 squared end 20 of the bushing 13, the bearing part is also rotated. The bearing part, is however, not axially adjustable, so that finally, during this rotation, the pin 12 is forwardly or rearwardly adjusted, since of course the internal screw-thread of the bearing part engages with the bolt screw-thread.

If it is desired to adjust the shaped element and therewith also the flat spring arm 21 vertically upwardly or downwardly, the hand wheel 16 is pushed inwardly until the apertures 24 are engaged by the pins 23 and the screw-threaded ring 14 is turned for example towards the left. By axial displacement of the screw-threaded ring, the clamping engagement of the flange on bushing 15 with plate 10 is loosened and bushing 15 and hence arm 21 can be pushed upwardly or downwardly in the slot 11. When the desired position has been reached, the hand wheel engaging with the pins 23 is now correspondingly rotated towards the right and plate 10 is clampingly engaged between ring 14 and the flange on bushing 15.

When the hand wheel is released, the spring 17 pushes it outwardly and the shaped back rest element 31 (FIG. 4) can, by rotation of wheel 16, be adjusted forwardly or rearwardly by linear movement of threaded pin 12. The hand wheel 16 is expediently provided with a knurled rim 25.

The embodiment of FIGS. 4 and 5 is suitable in particular for bus and lorry seats and has a compensation bar which includes a central horizontally and rectilinearly extending portion 27 which is positioned directly under the sinusoidal springs 28. Opposite lateral parts 26 lead from the ends of portion 27 to the lower ends of a frame 40. These ends of the lateral parts 26 are rigidly connected with the frame. The frame 40 can be U-shaped, engaging about fixed spars 37 on both sides but being vertically displaceable on the spars 37. Bearings are preferably provided between the parts 37 and 40. Flat spring 21 of the shaped element 31 is secured to a suitable cross-member connected with the longitudinally displaceable frame 40.

During travel over streets or roads having a rough surface, holes or the like, and if the body of the driver is suddenly moved upwardly and downwardly, the compensation bar or portion 27 is simultaneously moved upwardly and downwardly and carries the movable frame 40 with it. Due to the simultaneous vertical displacement of the flat spring 21 and its associated shaped element 31, the latter adapts itself to the vertical position of the driver's backbone, independently of when or how the impacts from the roadway are transmitted to the vehicle.

According to the embodiment of FIG. 3, a plurality of shaped elements 31a are connected to a transversely arranged resilient rod 32.

When it is expedient to subdivide the shaped element into a plurality of component members 31a, these may be arranged pivotally on the flat spring 32. By this means, an especially intimate adaptation of the backbone portion to the shaped element is achieved. The individual component members 31a can furthermore themselves be made resilient, for example, they may contain a layer of foam rubber.

Fundamentally, the use of the shaped element makes it possible to do without special springs, for example, the usual sinusoidal springs on the upper frame. However it may be desirable to fill out the zone of the upper frame with tensioning elements. The shaped element or the shaped element component members are then provided with eye pieces 33 for the spring 32 as well as upper and lower eye pieces 34, 35 through which the resilient bands 36 or bands of textile material or the like are passed in the vertical direction, the bands or belts or the like being secured at their ends to the frame.

Since, as a rule, the shaped element does not extend over the entire width of the back rest, additional bands 36 may be positioned beyond the ends of the shaped element and secured at their two ends (FIG. 3). In this way, the construction of the back rest is simplified and, above all, it is made less expensive, since resilient bands, belts, etc., are relatively simple to manufacture. It will thus be seen that by the previously described adjustment of wheel 16, spring 21 and hence element 31 or, alternatively, elements 31a may be adjusted forwardly or rearwardly relative to the seat back, or upwardly or downwardly to provide maximum comfort for the rider. The invention is, however, not limited to this arrangement and it is, in special cases, also possible to arrange zigzag or sinusoidal springs in place of the belt bands 36 on the upper frame 29, if special springing effects are desired.

The invention is not limited to the constructional examples discussed hereinabove.

Although specific embodiments of the invention have been illustrated and described, the invention is not so limited and other changes may be made within the spirit and scope of the invention, as defined in the appended claims.

What is claimed is:

1. A back support attachment for vehicle seat backs comprising a plate having a vertical guideway therein, an externally threaded bushing in said guideway, a flange on said bushing on one side of said plate, an internally threaded clamping ring on the other side of said plate threadedly engaging said bushing, pins on the face of said clamping ring, an internally threaded bushing extending slidably through said first mentioned bushing, a hand wheel fixed to the end of said internally threaded bushing, spring means between said first mentioned bushing and said wheel biasing said wheel outwardly from said ring, recesses on the inner face of said wheel engageable with said pins whereby inward pressure on said wheel engages said pins and recesses for rotating said ring relative to said externally threaded bushing to release the clamping action of said ring and said flange to permit linear vertical movement of said bushing in said guideway, a threaded pin engaging the internal threads of said internally threaded bushing, a spring arm fixed to the inner end of said pin, means securing one end of said arm in said guideway to preclude rotation of said pin whereby rotation of said hand wheel and hence said internally threaded bushing moves said spring arm inwardly or outwardly relative to said seat back, and a back rest element secured to the other end of said spring arm.

2. The structure of claim 1 wherein said back rest element includes at least one transverse pivotally mounted arcuately faced element.

3. The structure of claim 2 wherein said back rest element includes a frame having a portion extending beneath the vehicle seat and a portion extending upwardly slidably mounted in guide channels in the seat back, said element being pivoted to said last mentioned portion.

4. The structure of claim 1 wherein said back rest element includes a frame having a portion beneath the vehicle seat and a portion extending upwardly, flexible vertical strips secured across the last mentioned portion, a transverse bar fixed to said spring arm, and a plurality of curved back support elements fixed to said last mentioned transverse bar and slidably mounted on said straps.

References Cited in the file of this patent

UNITED STATES PATENTS

| | | |
|---|---|---|
| 856,058 | Hanger | June 4, 1907 |
| 1,182,854 | Poler | May 9, 1916 |
| 1,264,265 | Brusius | Apr. 30, 1918 |
| 1,551,730 | Case | Sept. 1, 1925 |
| 2,756,809 | Endresen | July 31, 1956 |
| 2,843,195 | Barvaeus | July 15, 1958 |

FOREIGN PATENTS

| | | |
|---|---|---|
| 849,798 | Great Britain | Sept. 28, 1960 |